(12) United States Patent
Chan

(10) Patent No.: US 12,287,525 B2
(45) Date of Patent: *Apr. 29, 2025

(54) OPTICAL ELEMENT DRIVING MECHANISM

(71) Applicant: TDK TAIWAN CORP., Taoyuan (TW)

(72) Inventor: Yi Liang Chan, Taoyuan (TW)

(73) Assignee: TDK TAIWAN CORP., Yangmei Taoyuan (TW)

(*) Notice: Subject to any disclaimer, the term of this patent is extended or adjusted under 35 U.S.C. 154(b) by 0 days.

This patent is subject to a terminal disclaimer.

(21) Appl. No.: 18/376,129

(22) Filed: Oct. 3, 2023

(65) Prior Publication Data

US 2024/0027723 A1    Jan. 25, 2024

Related U.S. Application Data

(63) Continuation of application No. 17/035,282, filed on Sep. 28, 2020, now Pat. No. 11,809,012, which is a continuation of application No. 16/242,512, filed on Jan. 8, 2019, now Pat. No. 10,823,932, which is a continuation of application No. 16/164,357, filed on Oct. 18, 2018, now Pat. No. 10,830,981, which is a
(Continued)

(30) Foreign Application Priority Data

Dec. 1, 2015    (TW) .................................. 104140047

(51) Int. Cl.
| | | |
|---|---|---|
| G02B 7/02 | (2021.01) | |
| G02B 7/08 | (2021.01) | |
| G02B 27/64 | (2006.01) | |
| G03B 3/10 | (2021.01) | |
| G03B 5/00 | (2021.01) | |
| G03B 13/36 | (2021.01) | |
| H04N 23/57 | (2023.01) | |

(52) U.S. Cl.
CPC ............... *G02B 7/026* (2013.01); *G02B 7/08* (2013.01); *G02B 27/646* (2013.01); *G03B 3/10* (2013.01); *G03B 5/00* (2013.01); *G03B 13/36* (2013.01); *G03B 2205/0053* (2013.01); *H04N 23/57* (2023.01)

(58) Field of Classification Search
CPC .......... G02B 7/02; G02B 7/021; G02B 7/023; G02B 7/026; G02B 7/04; G02B 7/08; G02B 7/09; G02B 7/10; G02B 7/102
USPC ................................. 359/819, 822, 823, 824
See application file for complete search history.

(56) References Cited

U.S. PATENT DOCUMENTS

| | | |
|---|---|---|
| 7,440,202 B2 | 10/2008 | Adachi et al. |
| 9,335,507 B2 | 5/2016 | Hagiwara |
| 10,139,586 B2 | 11/2018 | Chan |
| (Continued) | | |

*Primary Examiner* — Nicholas R. Pasko
(74) *Attorney, Agent, or Firm* — Muncy, Geissler, Olds & Lowe, P.C.

(57) ABSTRACT

An optical element driving mechanism is provided. The optical element driving mechanism includes a fixed part, a movable part, a driving assembly, and a damping element. The movable part is movable relative to the fixed part. The movable part holds an optical element with an optical axis. The driving assembly drives the movable part to move relative to the fixed part. The damping element inhibits shake generated by the movable part. The fixed part includes a fixed part recess corresponding to the damping element.

19 Claims, 15 Drawing Sheets

Related U.S. Application Data continuation of application No. 15/181,145, filed on Jun. 13, 2016, now Pat. No. 10,139,586.

(56) References Cited

U.S. PATENT DOCUMENTS

| | | | |
|---|---|---|---|
| 10,295,779 B2 | 5/2019 | Kao et al. | |
| 10,345,614 B2 * | 7/2019 | Ichihashi | G02B 7/08 |
| 10,571,650 B2 | 2/2020 | Yu et al. | |
| 10,684,447 B2 * | 6/2020 | Wu | G02B 7/10 |
| 10,823,932 B2 * | 11/2020 | Chan | G02B 7/09 |
| 10,976,476 B2 * | 4/2021 | Fan | H04N 23/55 |
| 11,022,726 B2 * | 6/2021 | Kuo | G03B 9/14 |
| 11,131,827 B2 * | 9/2021 | Hu | G02B 27/646 |
| 11,262,528 B2 * | 3/2022 | Lin | H02K 5/24 |
| 11,300,759 B2 * | 4/2022 | Yu | G02B 7/08 |
| 11,809,012 B2 * | 11/2023 | Chan | G02B 7/08 |
| 2008/0175578 A1 | 7/2008 | Wu et al. | |
| 2012/0229926 A1 | 9/2012 | Wade et al. | |
| 2013/0039640 A1 | 2/2013 | Sekimoto | |
| 2013/0050828 A1 | 2/2013 | Sato et al. | |
| 2013/0215511 A1 | 8/2013 | Wu et al. | |
| 2015/0055231 A1 | 2/2015 | Hagiwara | |
| 2016/0139425 A1 * | 5/2016 | Park | G03B 5/02 |
| | | | 359/557 |
| 2016/0274375 A1 | 9/2016 | Park et al. | |
| 2019/0049690 A1 | 2/2019 | Chan | |
| 2019/0137725 A1 | 5/2019 | Chan | |

\* cited by examiner

OPTICAL ELEMENT DRIVING MECHANISM

CROSS REFERENCE TO RELATED APPLICATIONS

The present application is a continuation application of U.S. patent application Ser. No. 17/035,282, filed on Sep. 28, 2020, which is a continuation application of U.S. patent application Ser. No. 16/242,512, filed on Jan. 8, 2019, which is a continuation application of U.S. patent application Ser. No. 16/164,357, filed on Oct. 18, 2018, which is a continuation application of U.S. patent application Ser. No. 15/181,145, filed on Jun. 13, 2016 (now U.S. Pat. No. 10,139,586 B2), which claims priority of Taiwan Patent Application Ser. No. 104140047, filed on Dec. 1, 2015 (now Taiwan Patent No. I 585484 B), the entirety of which are incorporated by reference herein.

BACKGROUND OF THE INVENTION

Field of the Invention

The invention relates to a lens driving device, and in particular to a lens driving device which requires less focusing time.

Description of the Related Art

Many mobile devices such as mobile phones are equipped with digital cameras as a basic requirement nowadays, and this is only possible thanks to the miniaturization of lens driving devices. In order to provide automatic focusing or zooming, a commonly used miniature lens driving device is a Voice Coil Motor (VCM), which carries a lens and can move the lens back and forth along an image-capturing optical axis by means of a coil, a magnet, and a spring sheet.

Generally, when a lens (of VCM) is moved to a fixed position to bring the subject into focus, it may shake for a period, and then is slowly reaches a steady state. This time required (for the lens) to move to the stop from being at rest is called the Dynamic Response Time, which affects the length of the focusing time of the lens driving device (The longer the Dynamic Response Time, the longer the focusing time. This adversely affects the effectiveness of the lens driving device). Therefore, how to shorten the Dynamic Response Time to reduce the focusing time of the lens driving device deserves careful consideration.

BRIEF SUMMARY OF THE INVENTION

An object of the invention is to provide a lens driving device which can reduce the shake generated by focusing the lens, so that the Dynamic Response Time and hence the focusing time can be shortened.

An embodiment of the invention provides a lens driving device, including a frame, a lens holder, a spring sheet, and at least one damping element. The lens holder is movably disposed in the frame. The spring sheet has an outer periphery portion, an inner periphery portion, and at least one arm portion. The outer periphery portion is combined with the frame, the inner periphery portion is combined with the lens holder, and the arm portion is connected between the outer periphery portion and the inner periphery portion. The damping element is connected between the arm portion of the spring sheet and at least one of the frame and lens holder.

In some embodiments, the arm portion of the spring sheet forms at least one protrusion that extends toward the frame, and the frame forms at least one recess corresponding to the protrusion, wherein the damping element is connected between the protrusion and the recess.

In some embodiments, the arm portion of the spring sheet forms at least one protrusion that extends toward the lens holder, and the lens holder forms at least one recess corresponding to the protrusion, wherein the damping element is connected between the protrusion and the recess.

In some embodiments, the frame forms at least one connected portion that protrudes from an inner side thereof, and the damping element is connected between the arm portion of the spring sheet and the connected portion.

In some embodiments, the inner periphery portion of the spring sheet forms at least one opening to which a part of a connected surface of the lens holder is exposed, and the damping element is connected between the arm portion of the spring sheet, the opening, and the exposed part of the connected surface of the lens holder.

In some embodiments, the damping element is connected to the arm portion of the spring sheet in a winding manner.

In some embodiments, the damping element is a soft gel.

In some embodiments, the damping element, the frame, and the lens holder include the same resin material.

In some embodiments, the frame and the spring sheet are respectively a top casing and an upper spring sheet of the lens driving device.

In some embodiments, the frame and the spring sheet are respectively a bottom base and a lower spring sheet of the lens driving device.

In order to illustrate the purposes, features, and advantages of the invention, the preferred embodiments and drawings of the invention are shown in detail as follows.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
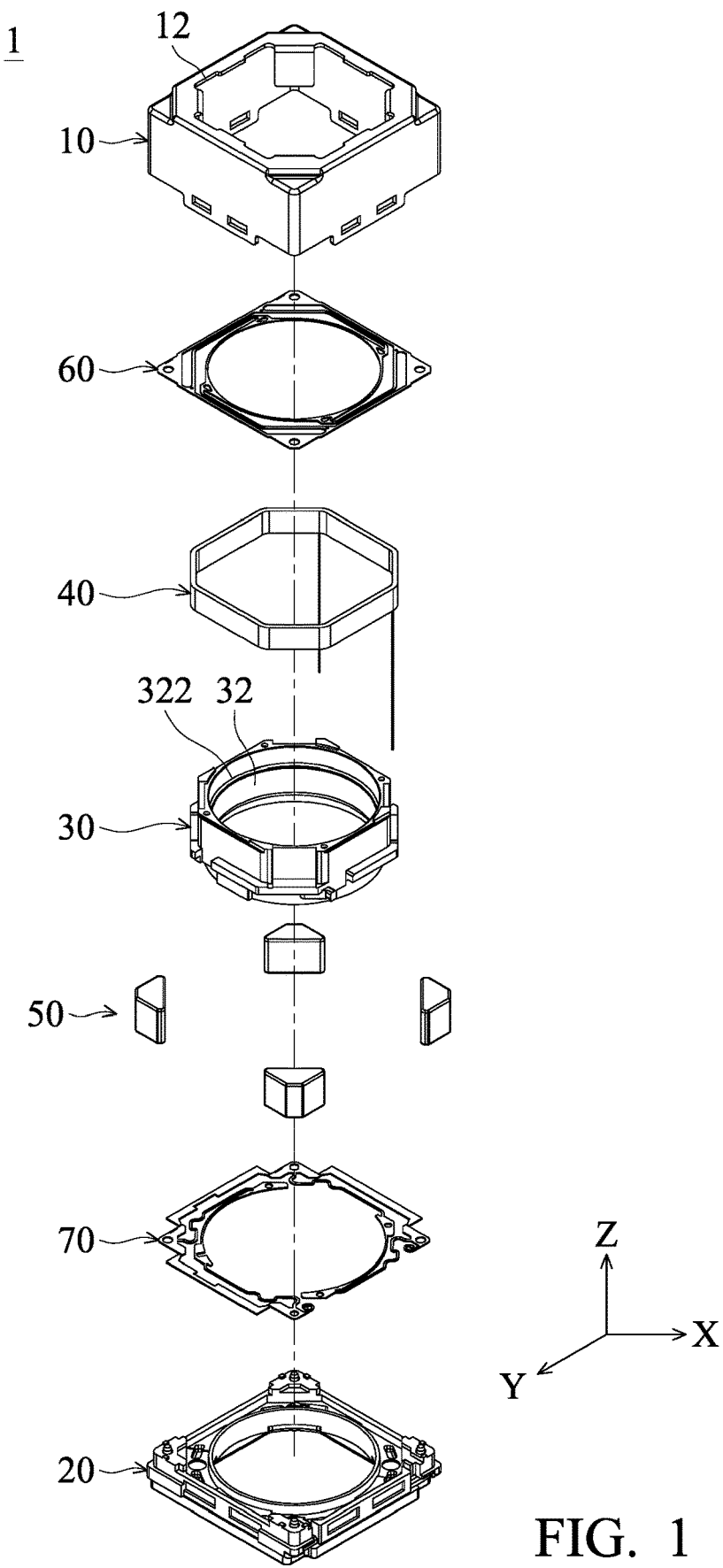
FIG. 1 is an exploded view of a lens driving device in accordance with an embodiment of the invention.

A detailed description is given in the following embodiments with reference to the accompanying drawings.

In the following detailed description, the orientations of "on", "above", "under", and "below" are used for representing the relationship between the relative positions of each element as illustrated in the drawings, and are not meant to limit the invention.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity. Furthermore, some elements not shown or described in the embodiments have the forms known by persons skilled in the field of the invention.

Figure 2:
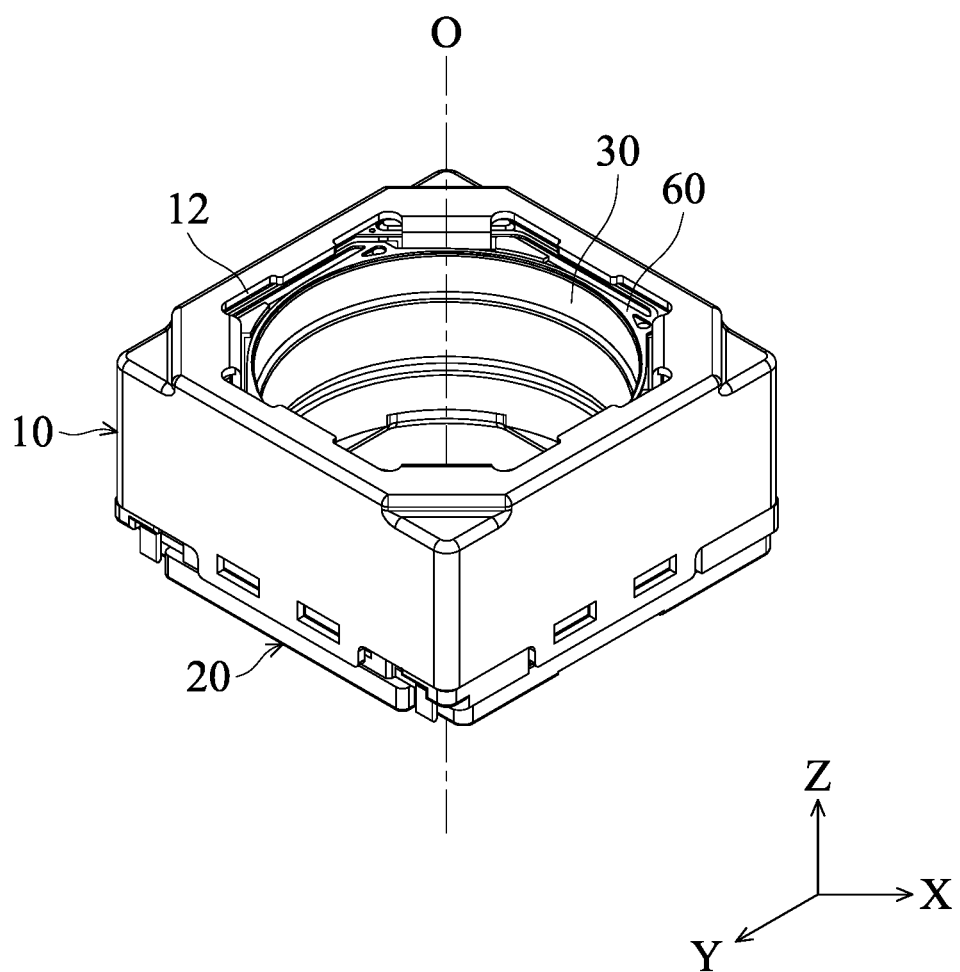
FIG. 2 is a schematic view of the lens driving device in FIG. 1 after assembly.

Please refer to FIG. 1 and FIG. 2, wherein FIG. 1 is an exploded view of a lens driving device 1 in accordance with an embodiment of the invention, and FIG. 2 is a schematic view of the lens driving device 1 after assembly. The lens driving device 1 may be a Voice Coil Motor (VCM), which defines three axial directions that are perpendicular to each other, namely an X-axis direction, a Y-axis direction, and a Z-axis direction, and includes a lens (not shown) therein, wherein the lens defines an image-capturing optical axis O which is substantially parallel to the Z-axis.

As shown in FIG. 1 and FIG. 2, the lens driving device 1 includes a top casing 10, a bottom base 20, a lens holder 30, a coil 40, a plurality of (e.g. four) magnets 50, an upper spring sheet 60, and a lower spring sheet 70.

In this embodiment, the top casing 10 is a hollow structure and can be combined with the bottom base 20 to form a receiving space, for receiving and protecting other parts of the lens driving device 1 as described above. Also, the top casing 10 has an opening 12 through which the lens (not shown) in the lens driving device 1 can capture light from the outside. The lens holder 30 is a hollow ring structure having a substantially octangular periphery and has a through hole 32, wherein the through hole 32 forms a thread structure 322 corresponding to another thread structure on the lens, such that the lens can be locked in the through hole 32. The coil 40 is wound around the periphery of the lens holder 30. The magnets 50 may be permanent magnets and are fixed at the four respective corners of the bottom base 20 and correspond to the coil 40. By varying the current input into the coil 40, different magnetic fields are generated between the coil 40 and the magnets 50 to drive the lens holder 30 and the lens therein back and forth along the image-capturing optical axis O, so that focusing or zooming is carried out It should be realized that the lens holder 30 is movably disposed in the receiving space formed by the top casing 10 and the bottom base 20 (the top casing 10 and the bottom base 20 form the frame of the lens driving device 1), and is elastically clamped by the movable inner periphery portions of the upper spring sheet 60 and the lower spring sheet 70. Accordingly, the upper and lower spring sheets 60 and 70 can limit the range in which the lens holder 30 can be moved and provide the buffer capacity for the displacement of the lens holder 30 along the X-axis, the Y-axis, and the Z-axis.

However, the above design (i.e. the lens holder 30 being clamped by the upper and lower spring sheets 60 and 70 which are flexible and thin sheet structure) also results in vibration/shake of the lens holder 30 and the lens therein when it is moved to a fixed position to bring the subject into focus, so that the Dynamic Response Time is extended. Therefore, the following further describes damping elements are used in various embodiments (with reference to FIGS. 3 to 9) of the invention so as to absorb and inhibit the shake generated by focusing the lens, thereby shortening the Dynamic Response Time and the focusing time and further improving the effectiveness of the lens driving device 1.

Figure 3A:
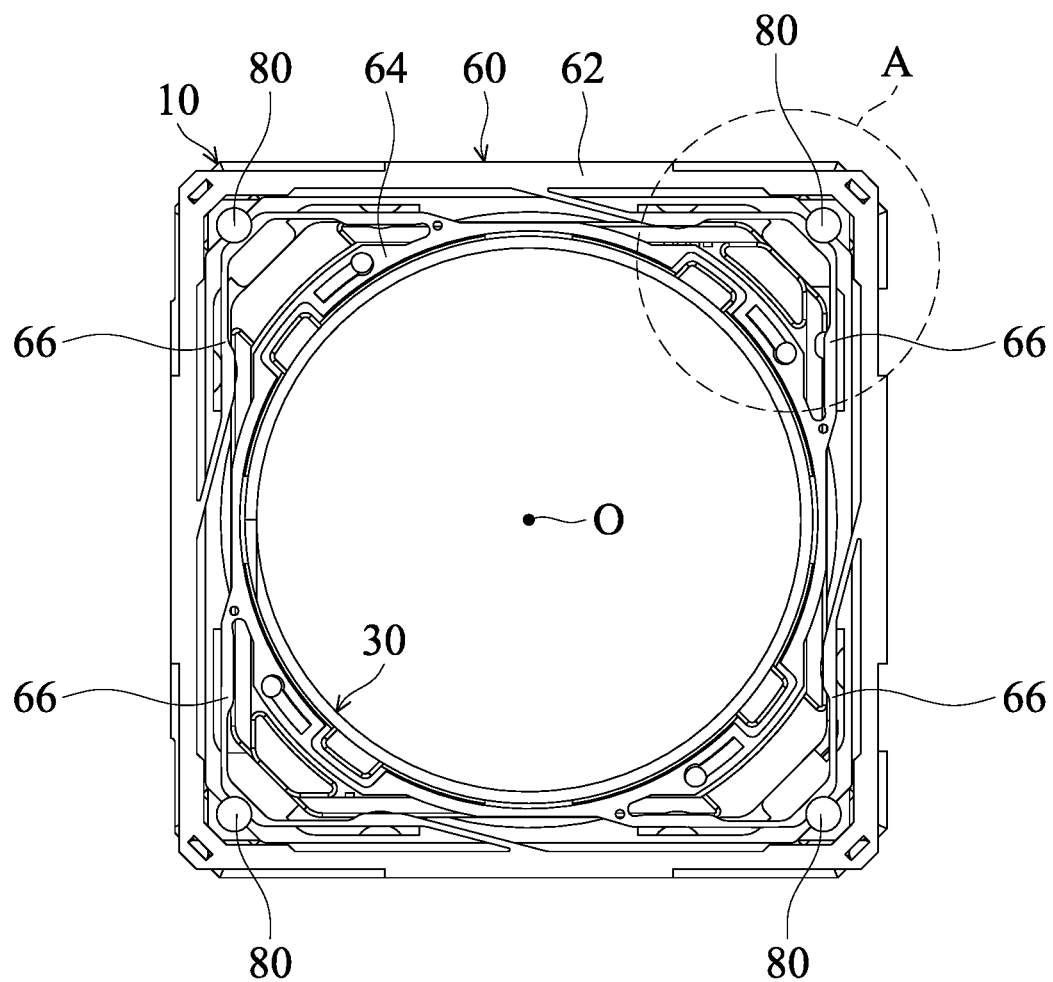
FIG. 3A is a schematic plane view illustrating the configuration of the spring sheet, damping elements, and frame of a lens driving device in accordance with an embodiment of the invention.
Figure 3B:
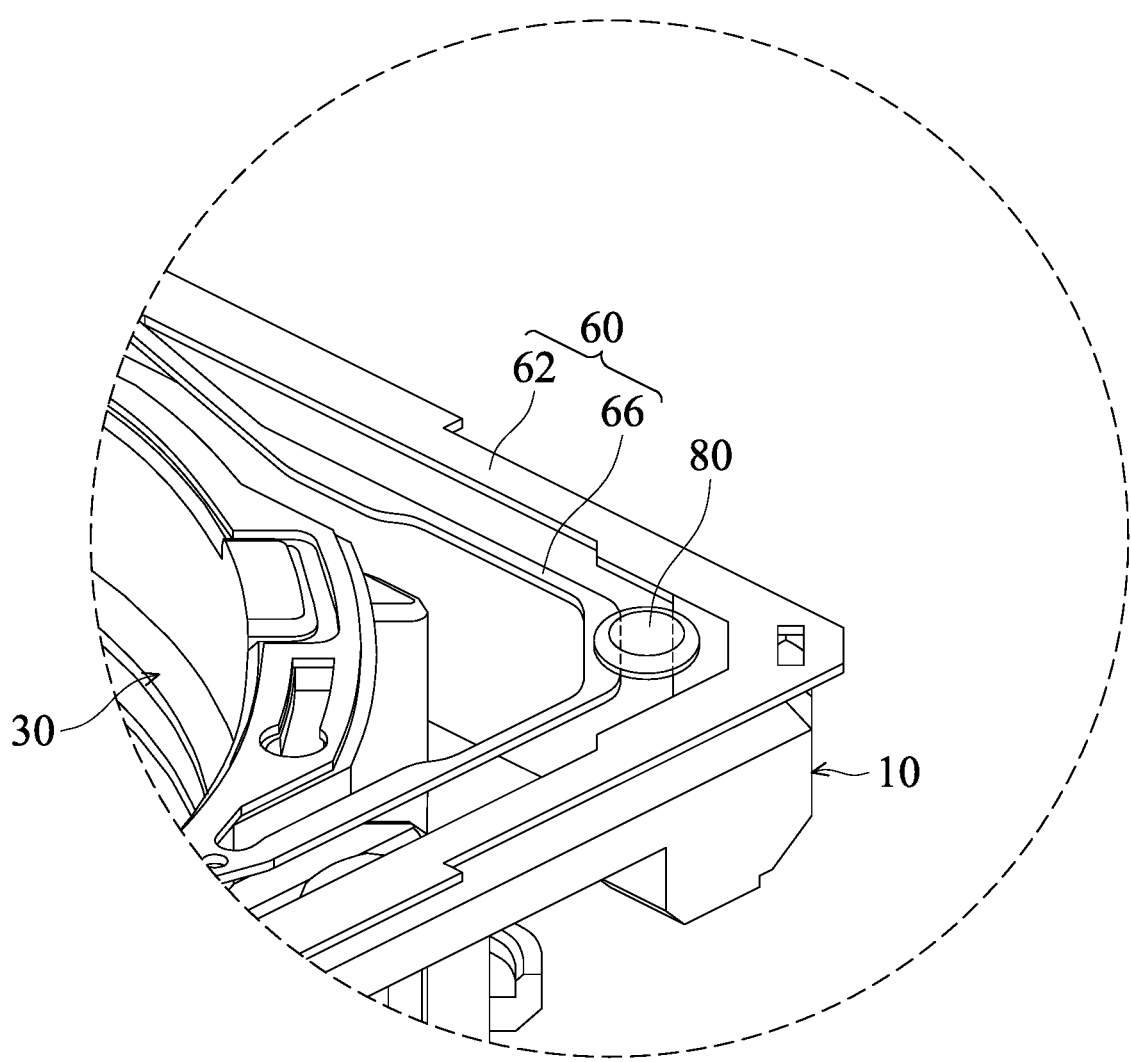
FIG. 3B is an enlarged perspective view of part A of FIG. 3A.

Please refer to FIG. 3A and FIG. 3B, wherein FIG. 3A is a schematic plane view illustrating the configuration of the spring sheet 60, damping elements 80, and frame 10 of a lens driving device in accordance with an embodiment of the invention, and FIG. 3B is an enlarged perspective view of part A of FIG. 3A. It should be realized that the upper spring sheet 60 and the top casing 10 of the lens driving device 1 are used as examples for illustration in this embodiment, but the upper spring sheet 60 and the top casing 10 may also be replaced by the lower spring sheet 70 and the bottom base 20 of the lens driving device 1 (FIG. 1).

As shown in FIG. 3A and FIG. 3B, the spring sheet 60 includes an outer periphery portion 62 having a substantially rectangular shape, an inner periphery portion 64 having a substantially annular shape, and a plurality of (e.g. four) elongated arm portions 66 connected between the outer periphery portion 62 and the inner periphery portion 64. The outer periphery portion 62 is configured to be combined with the four corners of the top casing 10 (the frame) by, for example, adhesive. The inner periphery portion 64 is configured to be combined with the lens holder 30 by, for example, adhesive. The four arm portions 66 extend between the outer periphery portion 62 and the inner periphery portion 64 and are symmetrical to each other with equal intervals, so as to increase the buffer capacity for the displacement of the lens holder 30 along the X-axis, the Y-axis, and the Z-axis.

Moreover, a plurality of (e.g. four) damping elements 80 can be disposed between the arm portions 66 of the spring sheet 60 and (the four corners of) the adjacent frame 10, wherein the damping elements 80 are coupled to the arm portions 66 and to the frame 10 (FIG. 3B), so that the damping elements 80 can absorb and inhibit the shake generated by the arm portions 66 of the spring sheet 60 when the lens is moved to a fixed position to bring the subject into focus. Therefore, the Dynamic Response Time and the focusing time are effectively shortened.

The damping elements 80 may be soft gel or any other applicable damping material. Also, the frame 10, preferably, may include resin material, so that a better bonding strength can be achieved between the damping elements 80 and the frame 10, thereby preventing the damping elements 80 from easily separating from the frame 10.

Figure 4:
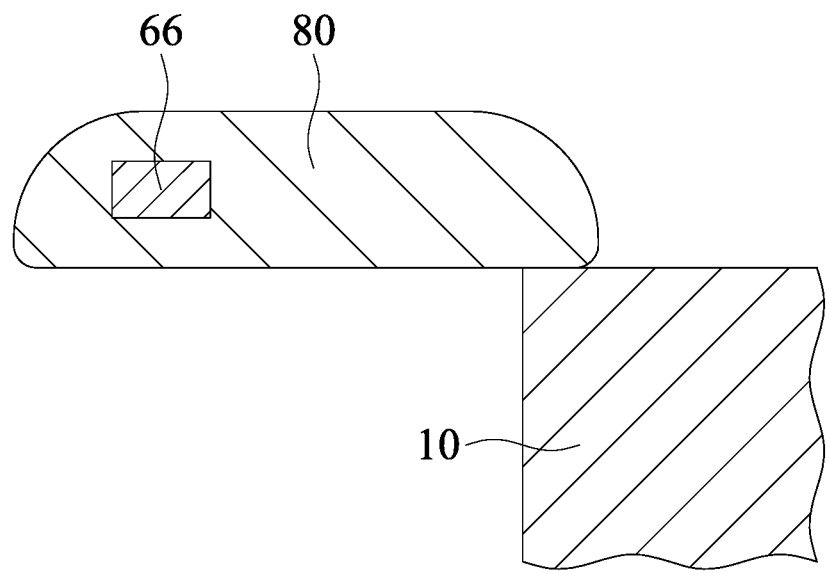
FIG. 4 is a schematic cross-sectional view illustrating the connection between the spring sheet and damping element in accordance with another embodiment of the invention.

FIG. 4 is a schematic cross-sectional view illustrating the connection between the spring sheet 60 and damping element 80 in accordance with another embodiment of the invention. As shown in FIG. 4, the damping element 80 can also be connected to the arm portion 66 of the spring sheet 60 in a winding manner. Thus, the bonding strength between the damping elements 80 and the metal spring sheet 60 can also be improved, thereby preventing the damping elements 80 from easily separating from the spring sheet 60.

Figure 5A:
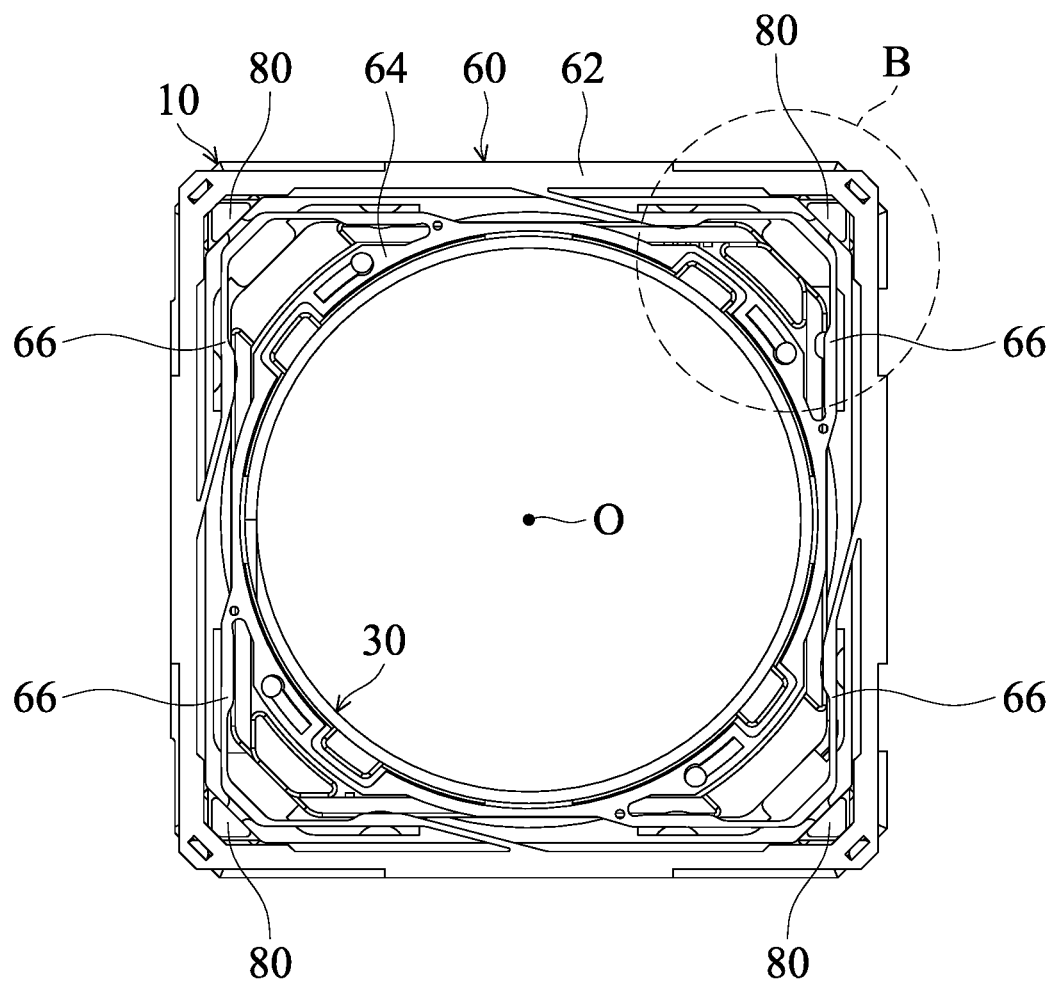
FIG. 5A is a schematic plane view illustrating the configuration of the spring sheet, damping elements, and frame of a lens driving device in accordance with another embodiment of the invention.
Figure 5B:
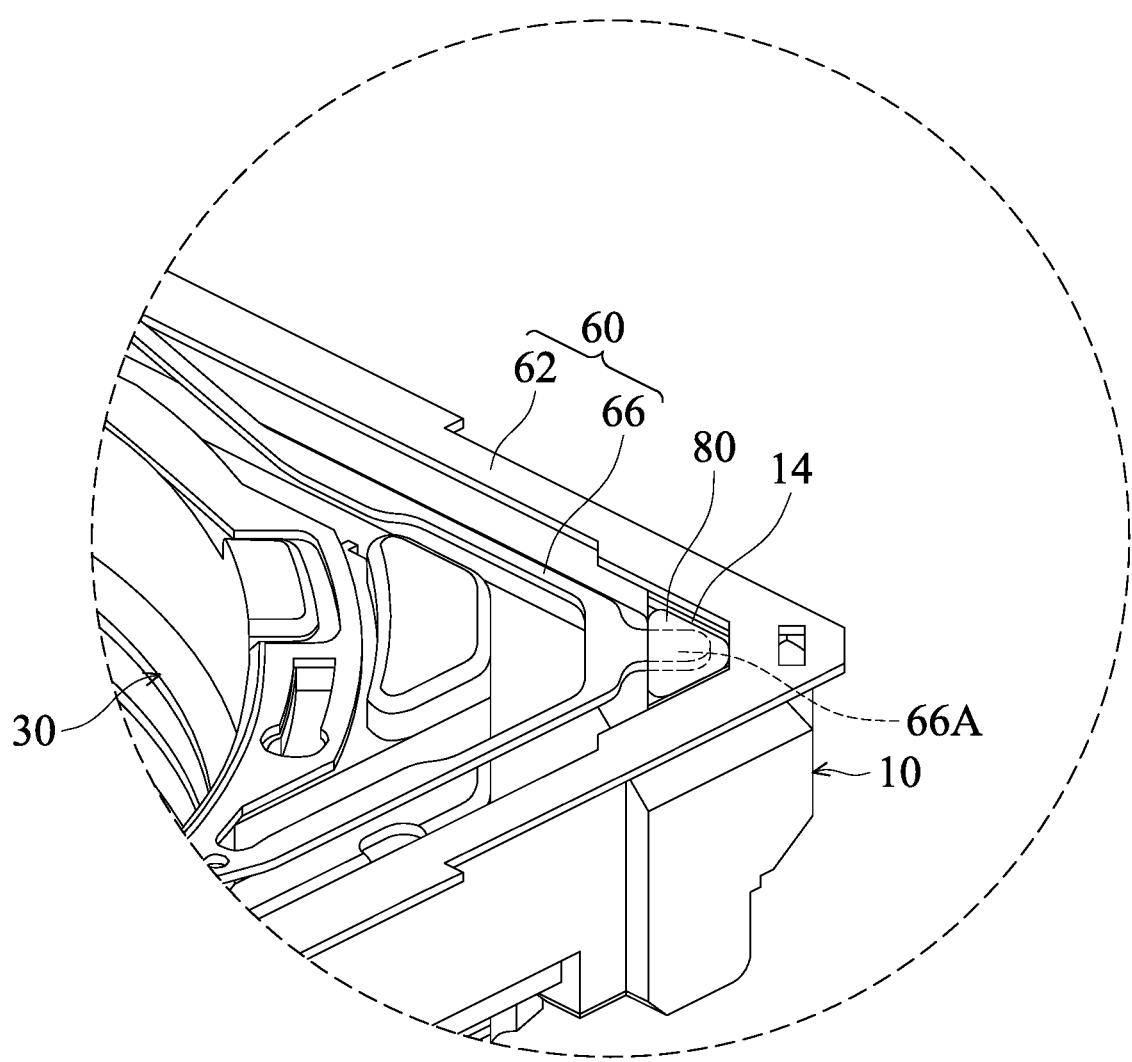
FIG. 5B is an enlarged perspective view of part B of FIG. 5A.

Please refer to FIG. 5A and FIG. 5B, wherein FIG. 5A is a schematic plane view illustrating the configuration of the spring sheet 60, damping elements 80, and frame 10 of a lens driving device in accordance with another embodiment of the invention, and FIG. 5B is an enlarged perspective view of part B of FIG. 5A. Note that this embodiment (FIGS. 5A and 5B) differs from the embodiment of FIGS. 3A and 3B in that the arm portions 66 of the spring sheet 60 further form a plurality of (e.g. four) protrusions 66A that extend toward the frame 10 and correspond to the four corners of the frame 10. Also, the frame 10 further forms a plurality of recesses 14 (FIG. 5B) corresponding to the protrusions 66A. Accordingly, the damping elements 80 can be connected between the protrusions 66A of the arm portions 66 and the recesses 14 of the frame 10 (in this embodiment, the damping elements 80 are coupled to the protrusions 66A and to the recesses 14, and parts of the damping elements 80 will flow into the gaps between the lower surfaces of the protrusions 66A and the recesses 14), so that the damping elements 80 can absorb and inhibit the shake generated by the arm portions 66 of the spring sheet 60 when the lens is moved to a fixed position to bring the subject into focus, thereby effectively shortening the Dynamic Response Time and the focusing time.

Moreover, the recesses 14 of this embodiment each are designed to have a triangular shape (but the invention is not limited thereto), and the damping element 80 correspondingly covers the entire triangular recess 14. Thus, the bonding strength between the damping elements 80 and the frame 10 can be increased, and the bonding strength between the protrusions 66A of the arm portions 66 and the frame 10 can also be increased. Furthermore, with the design of the recesses 14, the damping elements 80 can be accurately adhered to and positioned in the desired positions, and the use amount of damping elements 80 is reduced.

Figure 6A:
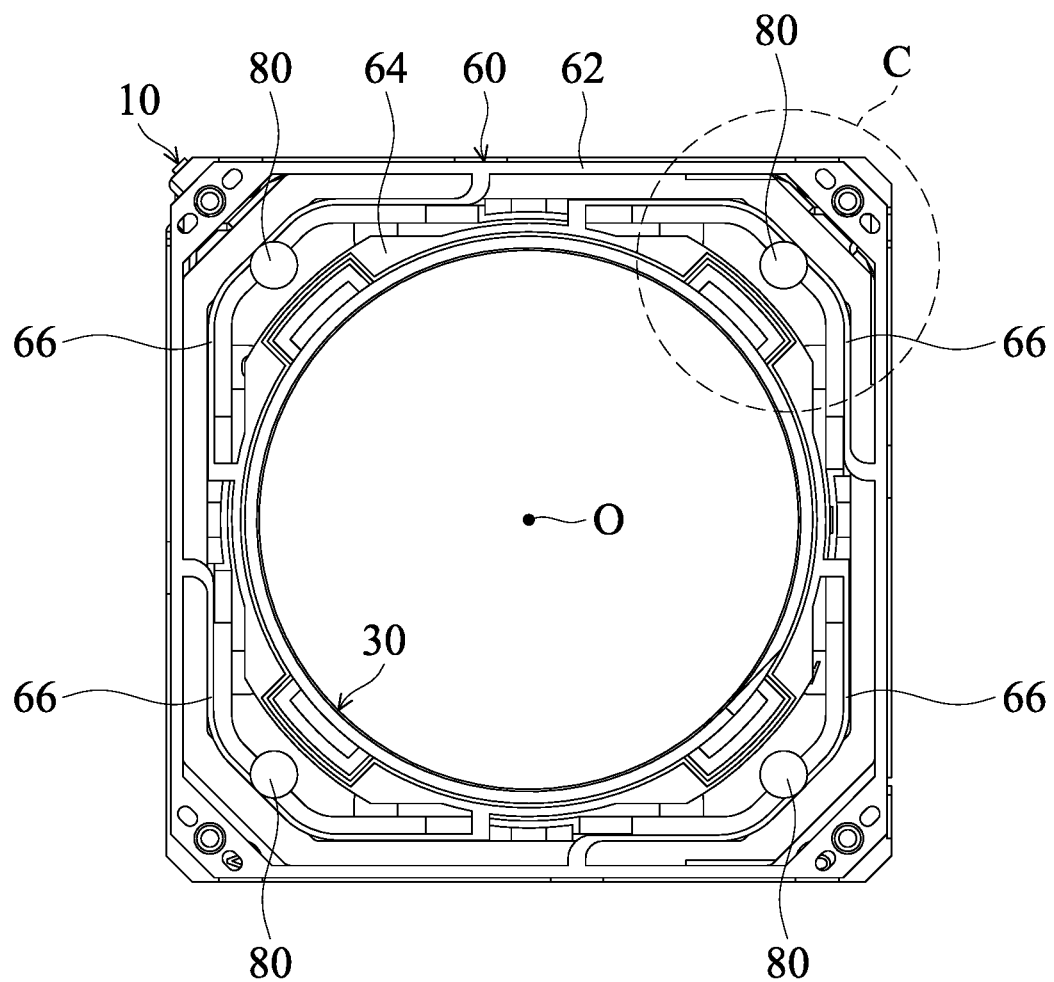
FIG. 6A is a schematic plane view illustrating the configuration of the spring sheet, damping elements, and lens holder of a lens driving device in accordance with another embodiment of the invention.
Figure 6B:
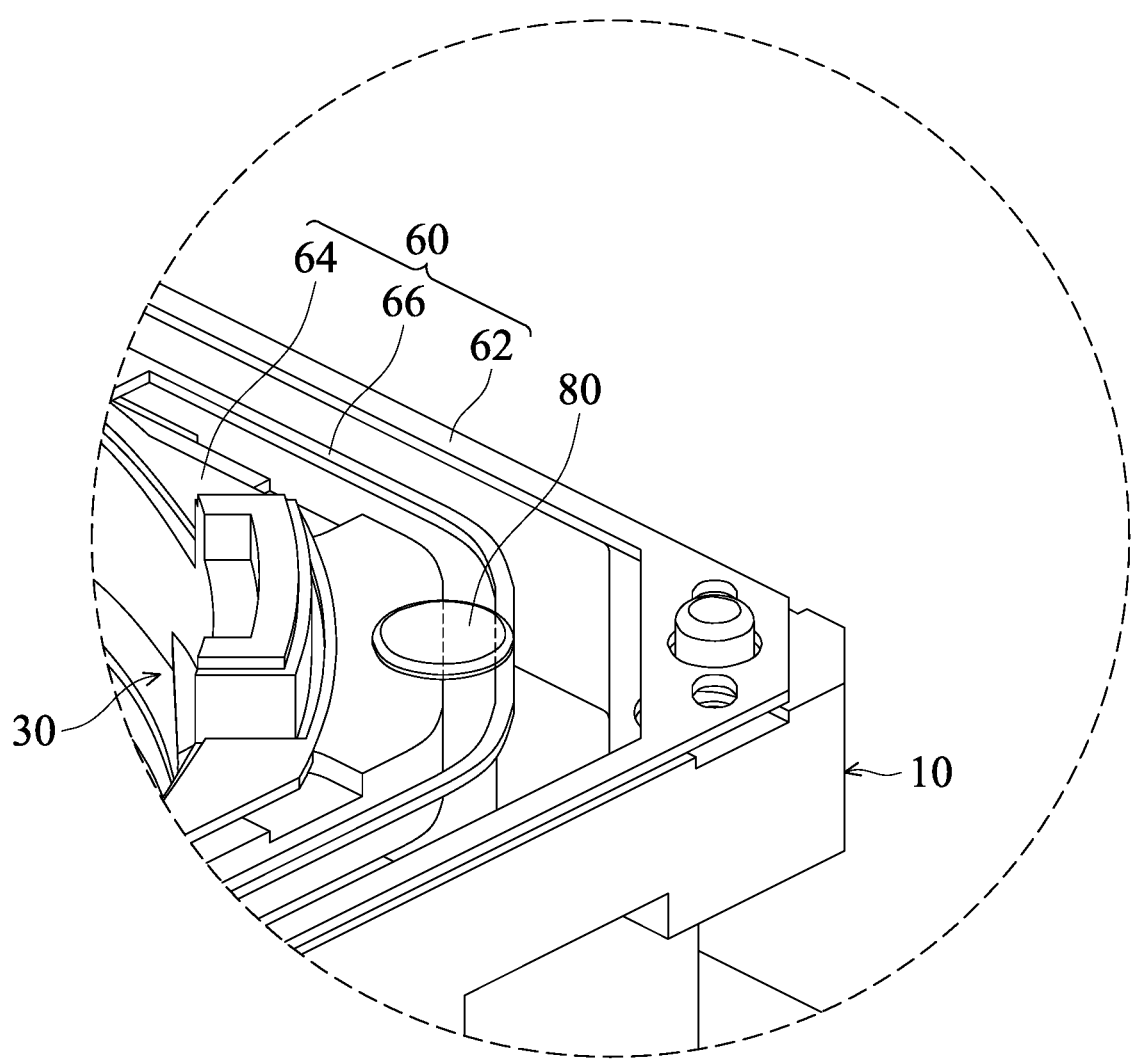
FIG. 6B is an enlarged perspective view of part C of FIG. 6A.

Please refer to FIG. 6A and FIG. 6B, wherein FIG. 6A is a schematic plane view illustrating the configuration of the spring sheet 60, damping elements 80, and lens holder 30 of a lens driving device in accordance with another embodiment of the invention, and FIG. 6B is an enlarged perspective view of part C of FIG. 6A. Note that this embodiment (FIGS. 6A and 6B) differs from the embodiment of FIGS. 3A and 3B in that the plurality of damping elements 80 are disposed between the arm portions 66 of the spring sheet 60 and the lens holder 30, wherein the damping elements 80 are coupled to the arm portions 66 and to the lens holder 30 (FIG. 6B), so that the damping elements 80 can absorb and inhibit the shake generated by the arm portions 66 of the spring sheet 60 when the lens is moved to a fixed position to bring the subject into focus, thereby effectively shortening the Dynamic Response Time and the focusing time.

In this embodiment, the damping elements 80 may be soft gel or any other applicable damping material. Also, the lens holder 30, preferably, may include resin material, so that a better bonding strength can be achieved between the damping elements 80 and the lens holder 30, thereby preventing the damping elements 80 from easily separating from the lens holder 30. In some embodiments, the damping element 80 can also be connected to the arm portion 66 of the spring sheet 60 in a winding manner. Thus, the bonding strength between the damping elements 80 and the metal spring sheet 60 can also be improved, thereby preventing the damping elements 80 from easily separating from the spring sheet 60.

Figure 7A:
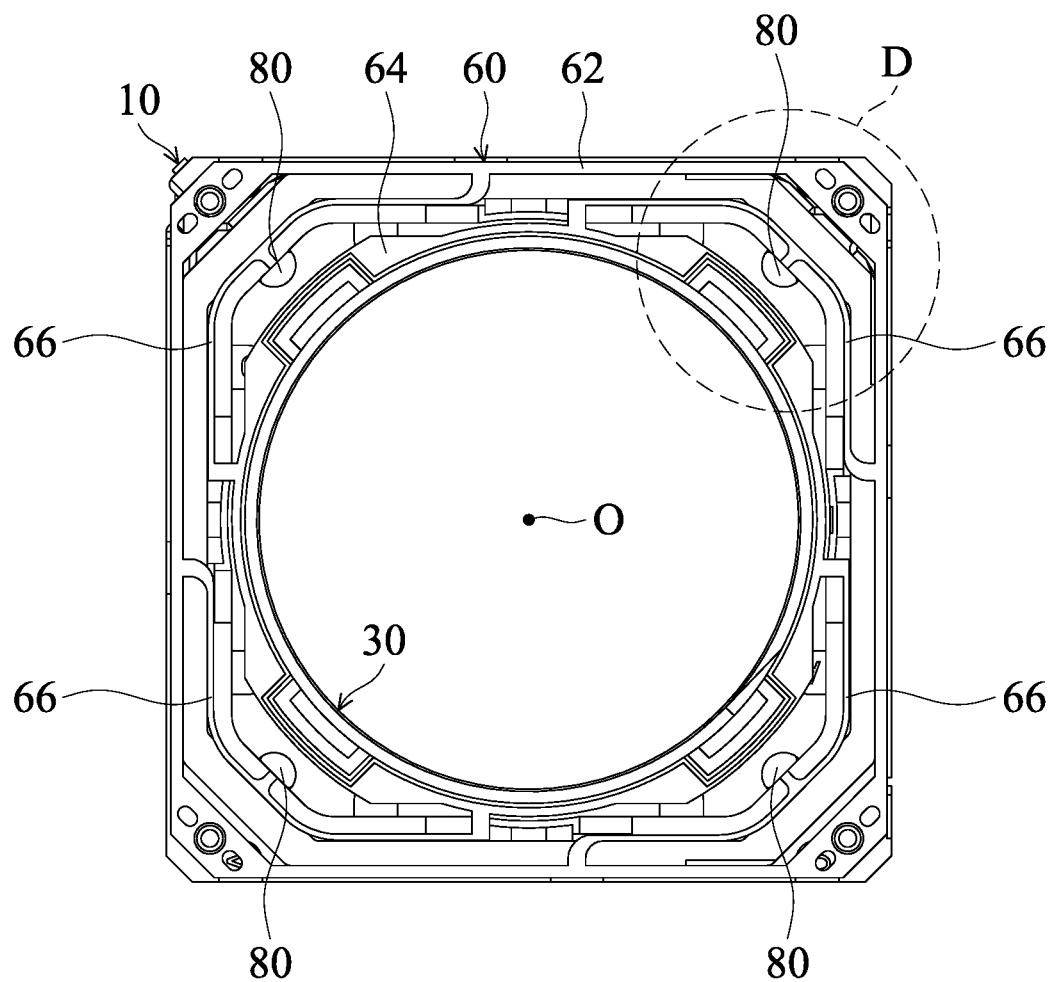
FIG. 7A is a schematic plane view illustrating the configuration of the spring sheet, damping elements, and lens holder of a lens driving device in accordance with another embodiment of the invention.
Figure 7B:
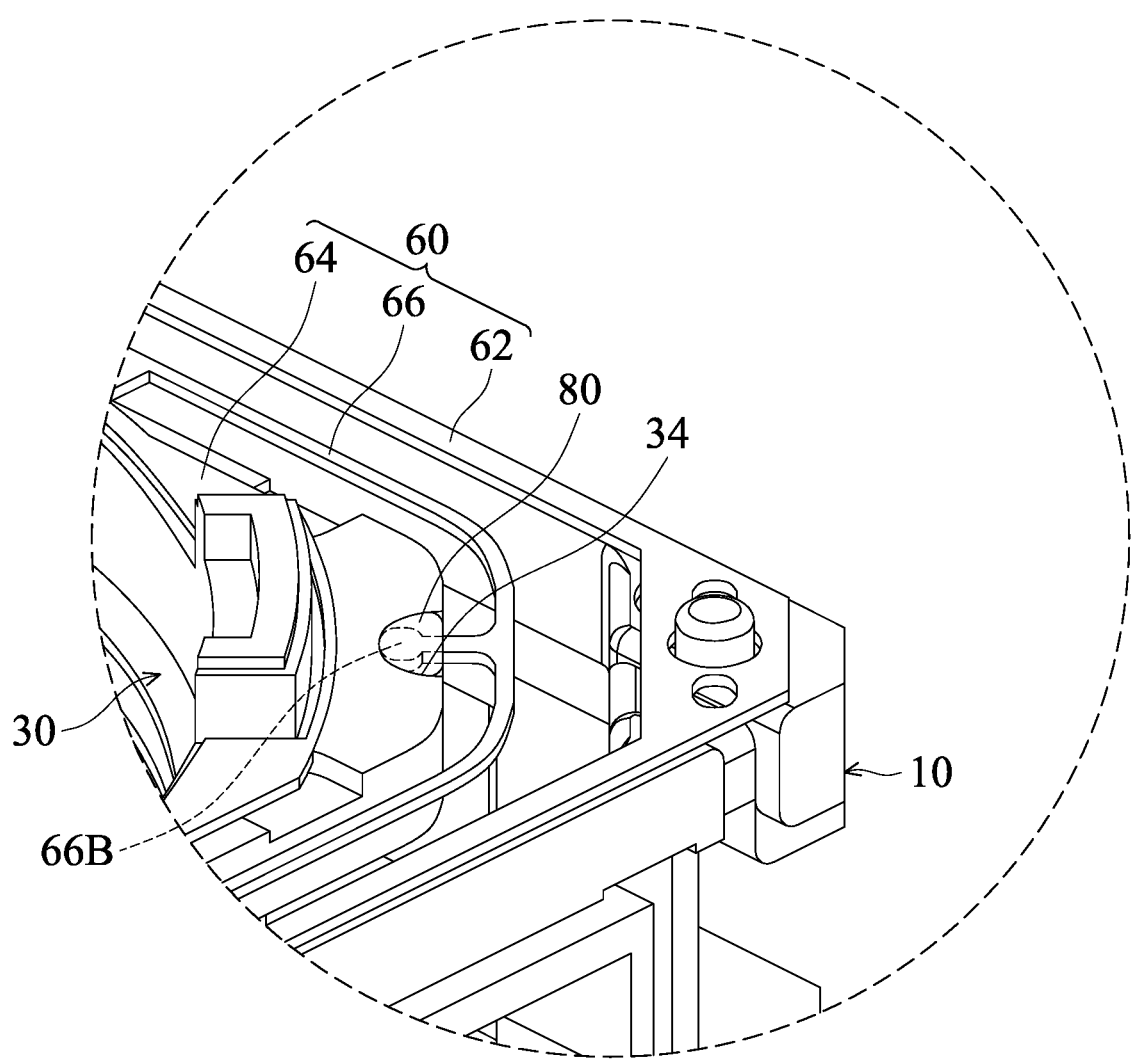
FIG. 7B is an enlarged perspective view of part D of FIG. 7A.

Please refer to FIG. 7A and FIG. 7B, wherein FIG. 7A is a schematic plane view illustrating the configuration of the spring sheet 60, damping elements 80, and lens holder 30 of a lens driving device in accordance with another embodiment of the invention, and FIG. 7B is an enlarged perspective view of part D of FIG. 7A. Note that this embodiment (FIGS. 7A and 7B) differs from the embodiment of FIGS. 6A and 6B in that the arm portions 66 of the spring sheet 60 further form a plurality of (e.g. four) protrusions 66B that extend toward the lens holder 30, and the lens holder 30 further forms a plurality of recesses 34 (FIG. 7B) corresponding to the protrusions 66B. Accordingly, the damping elements 80 can be connected between the protrusions 66B of the arm portions 66 and the recesses 34 of the lens holder 30 (in this embodiment, the damping elements 80 are coupled to the protrusions 66B and to the recesses 34, and parts of the damping elements 80 will flow into the gaps between the lower surfaces of the protrusions 66B and the recesses 34), so that the damping elements 80 can absorb and inhibit the shake generated by the arm portions 66 of the spring sheet 60 when the lens is moved to a fixed position to bring the subject into focus, thereby effectively shortening the Dynamic Response Time and the focusing time.

Moreover, the recesses 34 of this embodiment each are designed to have a semicircular shape (but the invention is not limited thereto), and the damping element 80 correspondingly covers the entire semicircular recess 34. Thus, the bonding strength between the damping elements 80 and the lens holder 30 can be increased, and the bonding strength between the protrusions 66B of the arm portions 66 and the lens holder 30 can also be increased. Furthermore, with the design of the recesses 34, the damping elements 80 can be accurately adhered to and positioned in the desired positions and the use amount of damping elements 80 is reduced.

Figure 8A:
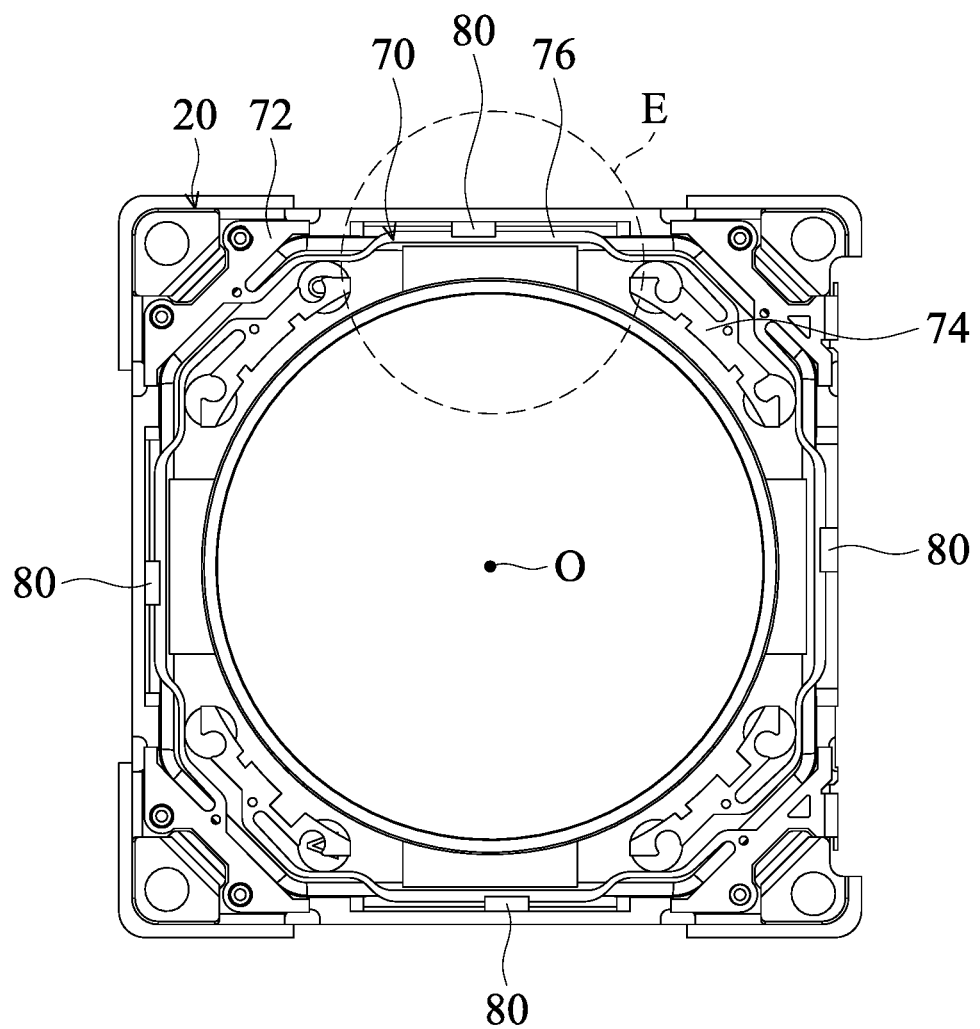
FIG. 8A is a schematic plane view illustrating the configuration of the spring sheet, damping elements, and frame of a lens driving device in accordance with another embodiment of the invention.
Figure 8B:
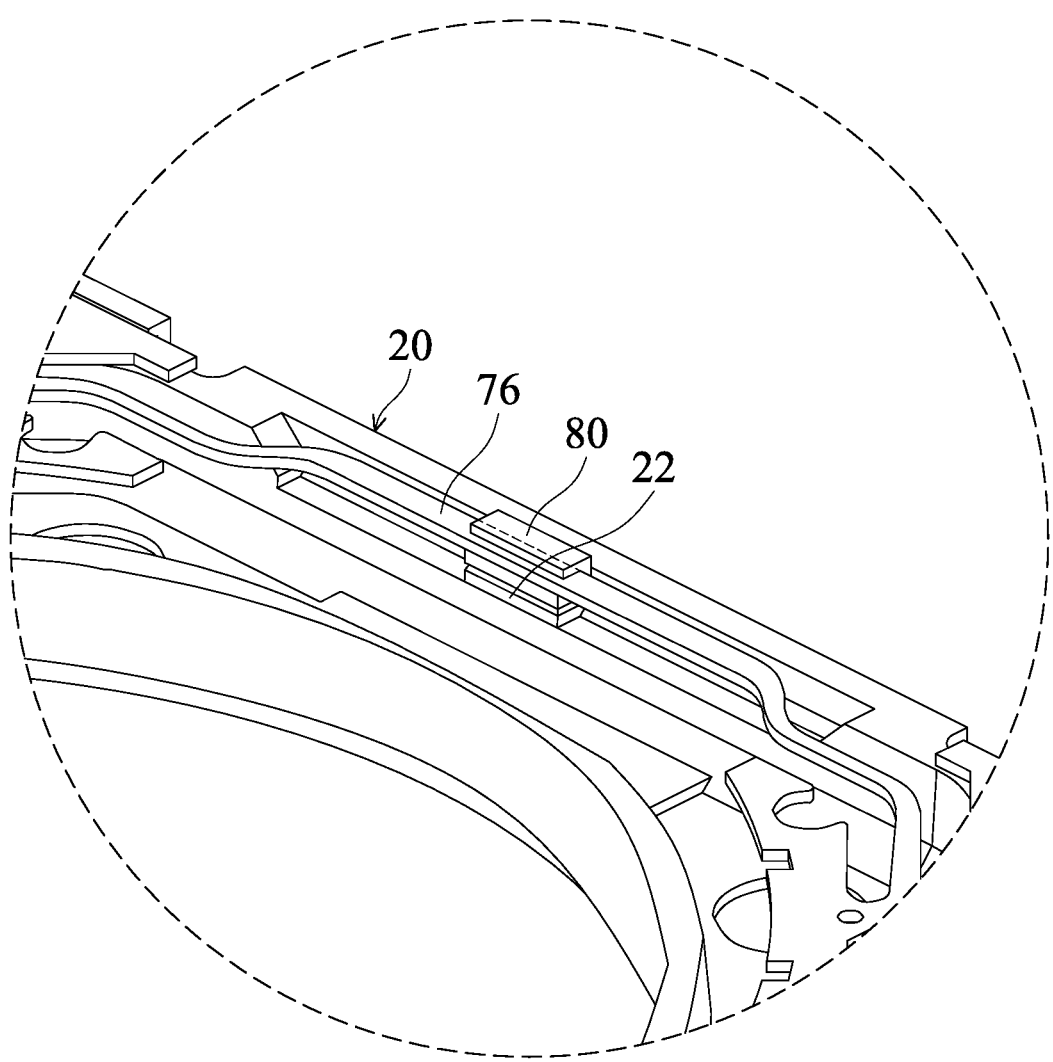
FIG. 8B is an enlarged perspective view of part E of FIG. 8A.

Please refer to FIG. 8A and FIG. 8B, wherein FIG. 8A is a schematic plane view illustrating the configuration of the spring sheet 70, damping elements 80, and frame 20 of a lens driving device in accordance with another embodiment of the invention, and FIG. 8B is an enlarged perspective view of part E of FIG. 8A. It should be realized that the lower spring sheet 70 and the bottom base 20 of the lens driving device 1 are used as examples for illustration in this embodiment, but the lower spring sheet 70 and the bottom base 20 may also be replaced by the upper spring sheet 60 and the top casing 10 of the lens driving device 1 (FIG. 1).

As shown in FIG. 8A and FIG. 8B, the spring sheet 70 also includes an outer periphery portion 72 configured to be combined with the bottom base 20 (the frame), an inner periphery portion 74 configured to be combined with the lens holder 30 (not shown), and a plurality of (e.g. four) elongated arm portions 76 connected between the outer periphery portion 72 and the inner periphery portion 74.

Moreover, the four sidewalls of the bottom base 20 further respectively form a connected portion 22 (FIG. 8B) that protrudes from the inner side thereof, and the corresponding arm portion 76 of the spring sheet 70 can be disposed on a side (e.g. the upper side) of the connected portion 22. Also, a plurality of damping elements 80 can be disposed between the arm portions 76 of the spring sheet 70 and the adjacent connected portions 22. More specifically, the damping elements 80 are adhered to the connected portions 22 and the inner sidewalls of the bottom base 20 and are connected to the arm portions 76 of the spring sheet 70 in a winding manner (it should be noted that the damping elements 80 each are at least connected to two opposite surfaces and another surface between the two surfaces of the corresponding arm portion 76), so that the damping elements 80 can absorb and inhibit the shake generated by the arm portions 76 of the spring sheet 70 when the lens is moved to a fixed position to bring the subject into focus, thereby effectively shortening the Dynamic Response Time and the focusing time. Furthermore, with the design of connected portions 22, the damping elements 80 can be accurately adhered to and positioned in the desired positions.

In this embodiment, the damping elements 80 may be soft gel or any other applicable damping material. Also, the bottom base 20 (the frame), preferably, may comprise resin material, so that a better bonding strength can be achieved between the damping elements 80 and the bottom base 20, thereby preventing the damping elements 80 from easily separating from the bottom base 20.

Figure 9A:
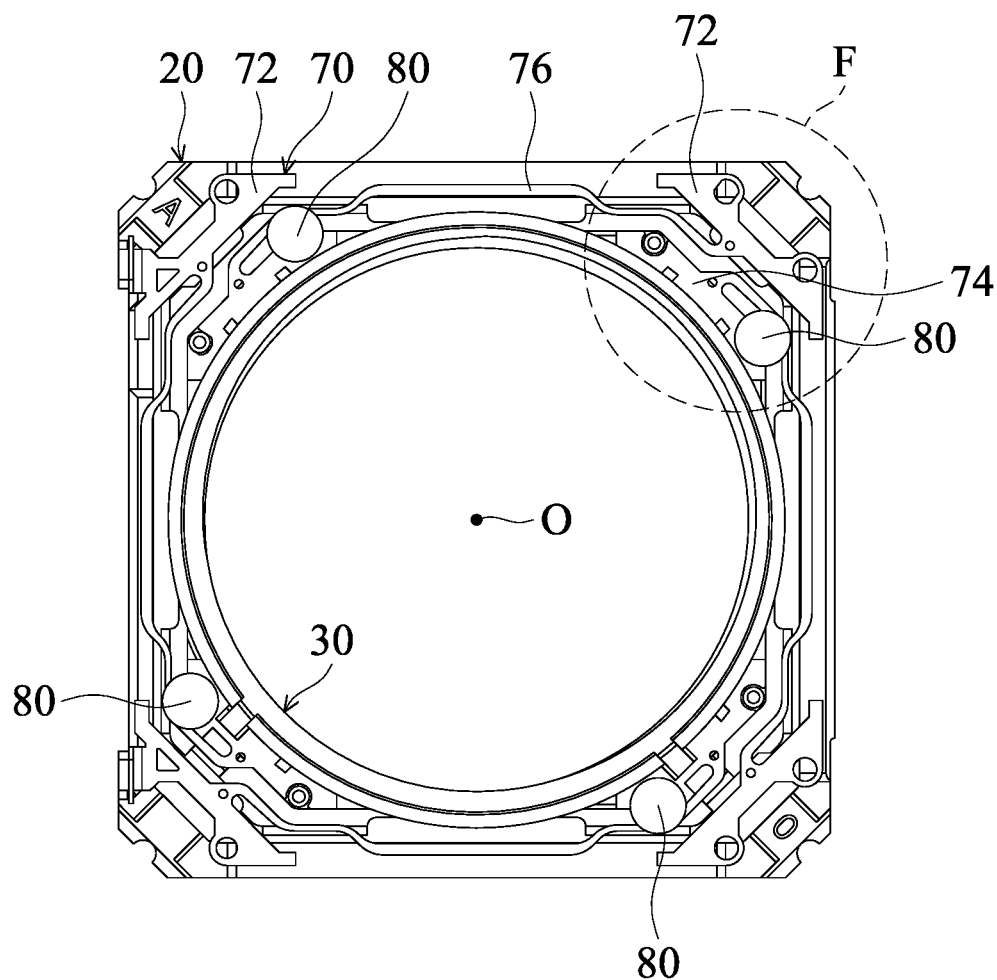
FIG. 9A is a schematic plane view illustrating the configuration of the spring sheet, damping elements, and lens holder of a lens driving device in accordance with another embodiment of the invention.
Figure 9B:
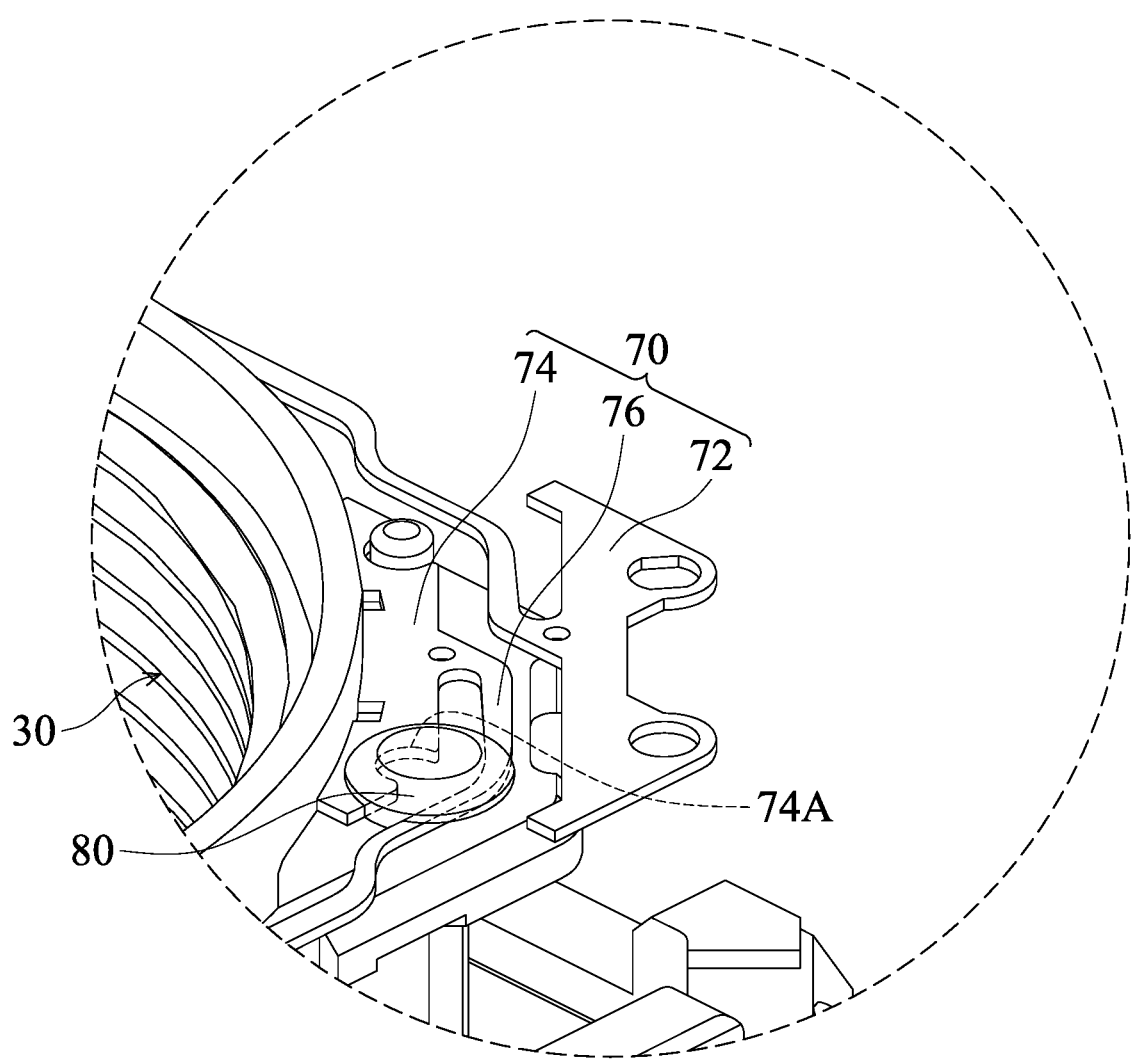
FIG. 9B is an enlarged perspective view of part F of FIG. 9A.

Please refer to FIG. 9A and FIG. 9B, wherein FIG. 9A is a schematic plane view illustrating the configuration of the spring sheet 70, damping elements 80, and lens holder 30 of a lens driving device in accordance with another embodiment of the invention, and FIG. 9B is an enlarged perspective view of part F of FIG. 9A. It should be realized that the lower spring sheet 70 of the lens driving device 1 is used as an example for illustration in this embodiment, but the lower spring sheet 70 may also be replaced by the upper spring sheet 60 (FIG. 1).

In this embodiment, the spring sheet 70 further forms a plurality of (e.g. four) openings 74A (FIG. 9B) on the inner periphery portion 74 for exposing parts of the connected surface of the lens holder 30. Moreover, the damping elements 80 are connected between the arm portions 76 of the spring sheet 70, the openings 74A and the exposed parts of the connected surface of the lens holder 30. Since the damping elements 80 are coupled to the arm portions 76 and to the lens holder 30, the damping elements 80 can absorb and inhibit the shake generated by the arm portions 76 of the spring sheet 70 when the lens is moved to a fixed position to bring the subject into focus, thereby effectively shortening the Dynamic Response Time and the focusing time.

With the design of openings 74A, the damping elements 80 may flow into the openings 74A and then are connected between the arm portions 76 of the spring sheet 70, the openings 74A, and the exposed parts of the connected surface of the lens holder 30. Thus, the damping elements 80 can be accurately adhered to and positioned in the desired positions and the bonding strength between the damping elements 80 and the lens holder 30 can also be improved further. In this embodiment, the damping elements 80 may be soft gel or any other applicable damping material. Also, the lens holder 30, preferably, may comprise resin material, so that a better bonding strength can be achieved between the damping element 80 and the lens holder 30, thereby preventing the damping elements 80 from easily separating from the lens holder 30. In some embodiments, the damping elements 80 may also be connected to the arm portions 76 of the spring sheet 70 in a winding manner, so that the boding strength between the damping elements 80 and the spring sheet 70 comprising metal material can also be improved further, thus preventing the damping elements 80 from easily separating from the spring sheet 70.

Although the lens driving device 1 of the aforementioned embodiments is used as a Voice Coil Motor (VCM), the invention is not limited thereto. The lens driving device provided in some embodiments of the invention may also be used in a camera module with Optical Image Stabilization (OIS) technology since it can drive the camera along the X-axis and the Y-axis.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical element driving mechanism, comprising:
a fixed part;
a movable part movable relative to the fixed part, wherein the movable part holds an optical element with an optical axis;
a driving assembly driving the movable part to move relative to the fixed part; and
a damping element inhibiting shake generated by the movable part,
wherein the fixed part comprises a fixed part recess corresponding to the damping element, the fixed part recess comprises a first surface facing the damping element and a second surface facing the damping element, and the first surface is not parallel with the second surface,
wherein the driving assembly comprises a coil and a magnetic element corresponding to the coil, and
wherein when viewed along the optical axis, at least part of the damping element is visible between the fixed part and the movable part.

2. The optical element driving mechanism as claimed in claim 1, wherein the first surface is not perpendicular to the optical axis.

3. The optical element driving mechanism as claimed in claim 1, wherein the second surface is not perpendicular to the optical axis.

4. The optical element driving mechanism as claimed in claim 1, wherein the fixed part recess at least partially overlaps the damping element when viewed from a direction that is perpendicular to the optical axis.

5. The optical element driving mechanism as claimed in claim 1, wherein the fixed part recess at least partially overlaps the damping element when viewed from the optical axis.

6. The optical element driving mechanism as claimed in claim 1, wherein the fixed part recess has a U-shaped structure.

7. The optical element driving mechanism as claimed in claim 1, wherein the fixed part recess has a polygonal shape.

8. The optical element driving mechanism as claimed in claim 1, wherein the fixed part is polygonal when viewed from the optical axis, and the fixed part recess is formed on a corner of the fixed part.

9. The optical element driving mechanism as claimed in claim 1, wherein at least a part of the damping element covers an entirety of the fixed part recess.

10. The optical element driving mechanism as claimed in claim 1, wherein the fixed part further comprises a fixed part concaved portion located at a same corner where the fixed part recess is located, and the damping element is not in contact with the fixed part concaved portion.

11. The optical element driving mechanism as claimed in claim 10, wherein a depth of the fixed part concaved portion is greater than a depth of the fixed part recess.

12. The optical element driving mechanism as claimed in claim 1, wherein the fixed part recess further comprises a third surface facing the damping element, and the third surface is not parallel with the first surface.

13. The optical element driving mechanism as claimed in claim 12, wherein the third surface is not perpendicular to the optical axis.

14. The optical element driving mechanism as claimed in claim 12, wherein the first surface is located between the second surface and the third surface.

15. The optical element driving mechanism as claimed in claim 12, wherein at least a part of the damping element covers an entirety of the first surface, an entirety of the second surface, and an entirety of the third surface.

16. The optical element driving mechanism as claimed in claim 12, wherein the fixed part recess further comprises a fourth surface facing the damping element, and the fourth surface is not parallel with the first surface.

17. The optical element driving mechanism as claimed in claim 16, wherein the fourth surface is not parallel with the second surface.

18. The optical element driving mechanism as claimed in claim 16, wherein the fourth surface is not parallel with the optical axis.

19. The optical element driving mechanism as claimed in claim 16, wherein the fourth surface is located at a same corner where the first surface, the second surface, and the third surface are located.

* * * * *